United States Patent
Kudrna et al.

(10) Patent No.: US 7,322,197 B2
(45) Date of Patent: Jan. 29, 2008

(54) VARIABLE RATE IGNITION

(75) Inventors: Richard Robert Kudrna, Greenfield Park (CA); Danielle Methot, Boucherville (CA)

(73) Assignee: Pratt + Whitney Canada Corp., Longueuil, Quebec (CA)

( * ) Notice: Subject to any disclaimer, the term of this patent is extended or adjusted under 35 U.S.C. 154(b) by 225 days.

(21) Appl. No.: 11/019,636

(22) Filed: Dec. 23, 2004

(65) Prior Publication Data

US 2006/0137357 A1 Jun. 29, 2006

(51) Int. Cl.
*F02C 7/264* (2006.01)

(52) U.S. Cl. .................. 60/776; 60/39.827; 60/786

(58) Field of Classification Search ............ 60/39.821, 60/39.827, 776, 786
See application file for complete search history.

(56) References Cited

U.S. PATENT DOCUMENTS

| | | | | |
|---|---|---|---|---|
| 4,414,804 A | * | 11/1983 | Menard et al. | ............... 60/786 |
| 5,091,858 A | | 2/1992 | Paielli | |
| 5,150,300 A | | 9/1992 | Danno et al. | |
| 6,353,293 B1 | * | 3/2002 | Frus et al. | ............. 315/209 R |

* cited by examiner

*Primary Examiner*—L. J. Casaregola
(74) *Attorney, Agent, or Firm*—Ogilvy Renault LLP

(57) ABSTRACT

Variable rate ignition method and system that take advantage of knowledge and analysis of environmental conditions and/or operational conditions. A variable ignition rate for igniting the engine permits an optimal use of the igniters and thereby prolongs their life as well as its associated maintenance schedule. Operating costs and durability are also enhanced. Furthermore, flexibility is enhanced since any changes to the method of determining the best spark rate can be made through update in the software of the engine controller instead of change in the hardware (e.g., the exciter).

7 Claims, 2 Drawing Sheets

VARIABLE RATE IGNITION

TECHNICAL FIELD

The present invention relates generally to ignition systems and method for gas turbine engines.

BACKGROUND OF THE ART

Prior art ignition exciters normally have fixed spark rates. These fixed spark rates are designed for an extreme point in the operating envelope of an engine. In order to accommodate this extreme requirement, the exciter has to be set to fire at the fastest rate at all times. This situation has the disadvantage of unduly inducing wear on spark igniters as well as reducing their lives. This results in having to replace igniters earlier than necessary and thereby increases already expensive engine maintenance costs. The stresses associated to the greater number of generated sparks/impulses also results in low durability and high operating costs for conventional exciters.

Furthermore, systems exist where two or more fixed spark rates are manually selected according to the stage of operation. These systems provide limited flexibility.

SUMMARY OF THE INVENTION

One aspect of the present invention provides an improved variable rate ignition method and apparatus.

In the present invention, the decision process for determining the spark rate of the igniter is entirely ensured by the engine controller. The exciter makes no decision and fires only upon receiving a signal from the engine controller. The engine controller therefore powers the exciter which in turn fires the igniter. This results in a simplification of the design of the exciter.

The present invention also simplifies engine installation. For a typical engine, the wire cable length between the electronic controller and the APU and exciter is approximately 22 meters. Each wire adds considerable weight and cost. The arrangement presented herein requires only two wires while conventional installations require four (i.e., two for power and two for control).

Also, the present invention provides a variable rate ignition method that takes advantage of knowledge and analysis of environmental conditions and/or operational conditions. A variable ignition rate for igniting the engine permits an optimal use of the igniters and thereby prolongs their life as well as its associated maintenance schedule. Furthermore, flexibility is enhanced since any changes to the method of determining the best spark rate can be made through update in the software of the engine controller instead of change in the hardware (e.g., the exciter).

In accordance with the present invention there is provided a method of igniting a gas turbine engine. The method comprises providing a fuel flow; gathering information on at least one of an environmental condition and an operating condition; selecting a desired spark rate based on the gathered information; and commanding a spark according to the selected spark rate.

In another embodiment, the present invention provides a system for igniting a flow of fuel to a gas turbine engine. The system comprises an engine controller to gather information on at least one of an environmental condition and an operating condition to determine a desired spark rate based on the gathered information. The system further comprises an exciter to command a spark according to the selected spark rate and an igniter to ignite the flow of fuel.

Further details of these and other aspects of the present invention will be apparent from the detailed description and Figures included below.

DESCRIPTION OF THE DRAWINGS

Reference is now made to the accompanying Figures depicting aspects of the present invention, in which.

DETAILED DESCRIPTION OF PREFERRED EMBODIMENTS

Figure 1:
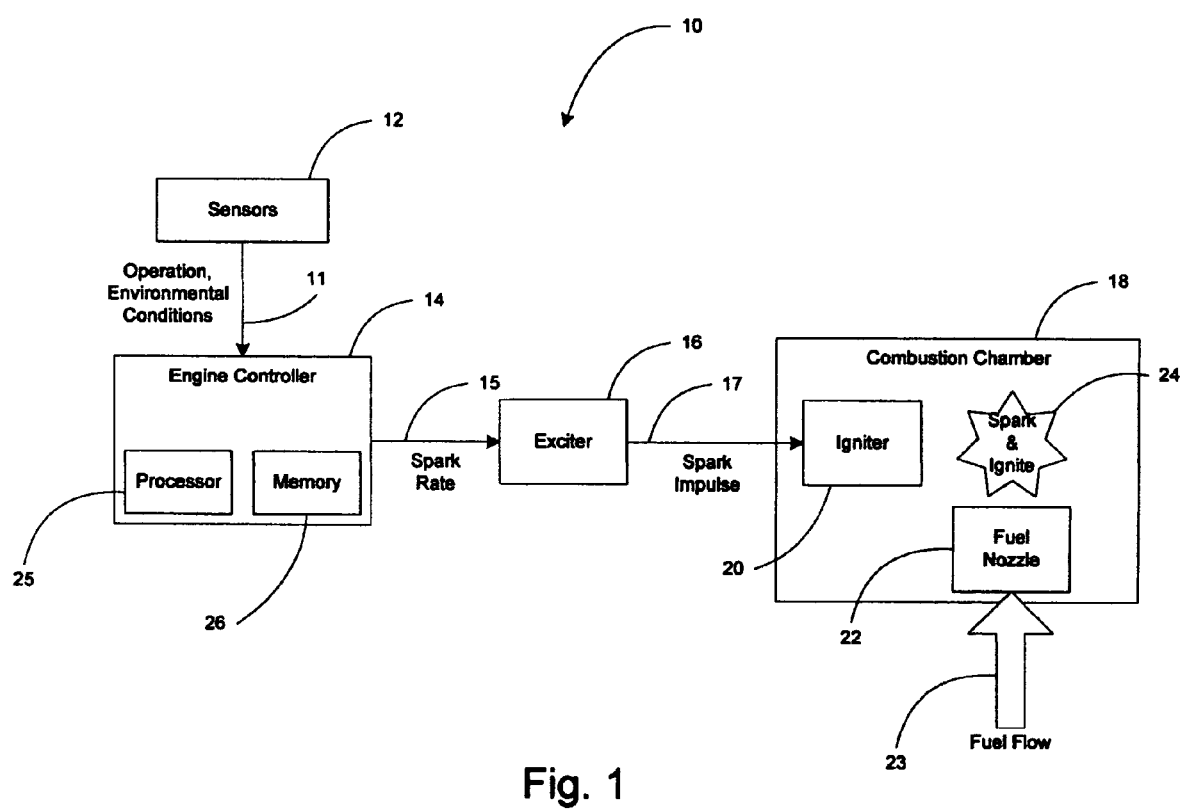
FIG. 1 is a block diagram of a variable rate ignition system according to an embodiment of the invention.

Referring to FIG. 1, there is shown a variable rate ignition system 10 according to an embodiment of the invention. System 10 includes Sensors 12, Engine Controller 14, Exciter 16, Igniter 20 and Fuel Nozzle 22. Igniter 20 and Fuel Nozzle 22 are included in Combustion Chamber 18 of a Gas Turbine Engine (GTE) (not shown).

It is foreseen that the present system 10 may be incorporated in any type of GTE installed, for example, aboard aircraft. System 10 may also be installed in any type of Auxiliary Power Units (APU). In aircraft GTEs, Engine Controller 14 is more commonly known as an Electronic Engine Controller (EEC) while in APUs it is referred to as an Engine Controller Box (ECB).

Sensors 12 are off-the-shelf items which are normally found in GTEs or APUS and are capable of sensing Environmental and/or Operational Conditions 11. Examples of such Environmental and/or Operational Conditions 11 include temperature of inlet air, engine oil, fuel, the exciter and exhaust gases. Other examples include pressure of ambient air, fuel and oil.

By examining this information, the Operational Conditions 11 can be determine. For example, a sea level, artic condition, cold soak condition is characterized by cold air, oil and fuel, with atmospheric pressure at approximately 1 Bar. A sea level, arctic condition start of a non cold soaked engine (e.g., recently running and still warm), would differ in that oil and fuel temperature would be above ambient. The latter set of condition would require a slower spark rate than the former.

Engine Controller 14 further includes Processor 25 and Memory 26. An appropriate Processor 25 and Memory 26 may be selected from those known by those skilled in the art. It was found that Processor 25 such as those made by Texas Instruments, IBM and Motorola work well. Processor are meant to include microprocessors, micro controllers, embedded controllers, DSPs and ASICs. An example of a specific micro controller is the Motorola MPC555. As for Memory 26, those made by AMD, INTERSIL and ZILOG are appropriate. Memory 26 types may includes EEPROMs (Electrically Erasable and Programmable Read Only Memory). Engine Controller 14 provides Desired Spark Rate 14 which is used by Exciter 16 to produce Spark impulse 17.

Compatible Igniter 20 and Fuel Nozzle 22 may be selected off-the-shelf by to those skilled in the art. Igniter 20 receives Spark impulse 17 and provides a spark 24 to light a fuel spray from Fuel Nozzle 22 receiving Fuel Flow 23.

Figure 2:
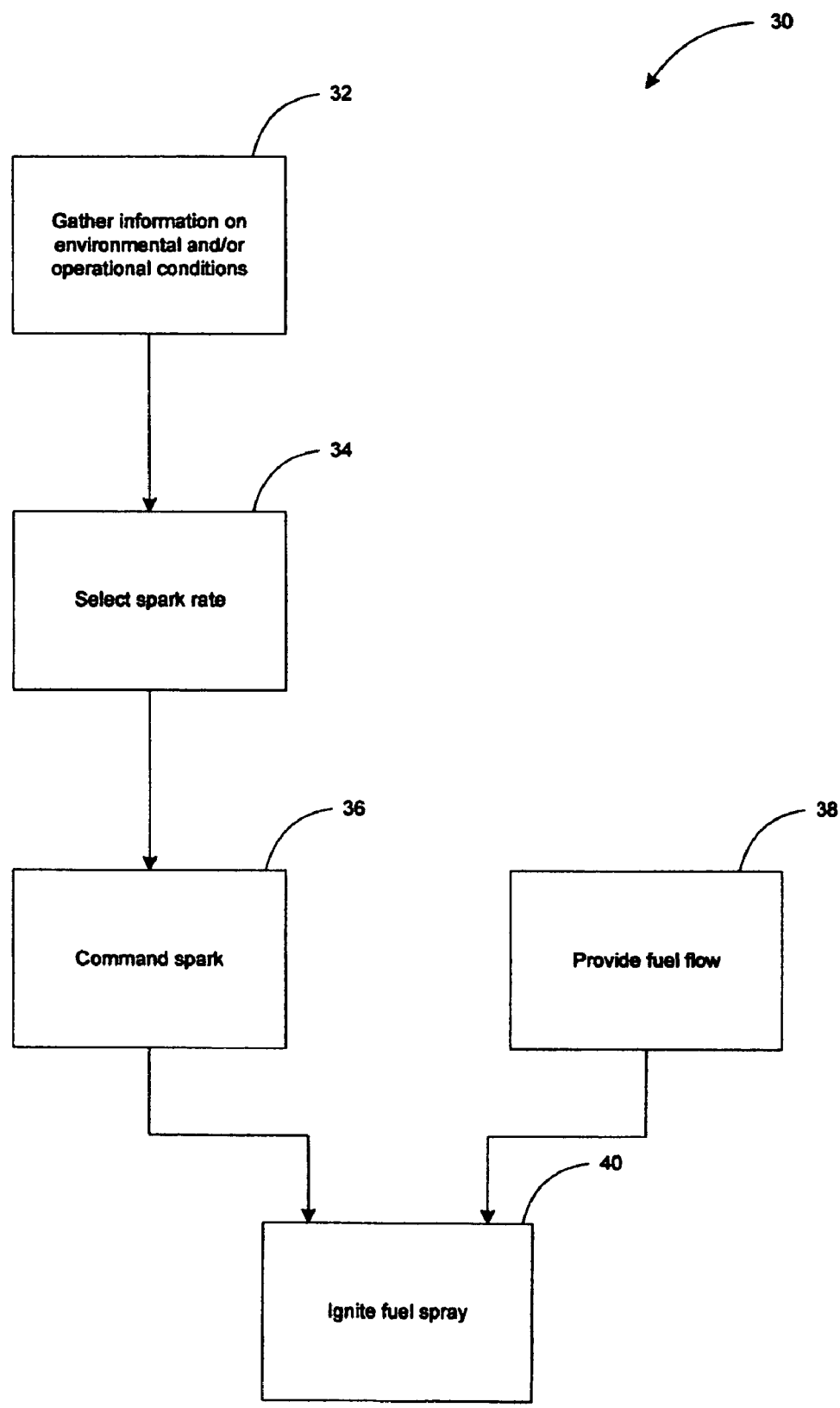
FIG. 2 is a flow chart of a variable rate ignition method according to an embodiment of the invention.

The operation of System 10 is described in more detail along with Method 30 shown in FIG. 2. Method 30 starts with the gathering of Environmental and/or Operational Conditions 11 (step 32) by Sensors 12.

The Environmental and/or Operational Conditions 11 are then used to select Desired Spark Rate 15 (step 34). Environmental and/or Operational Conditions 11 may be fed directly to a program being run by Processor 25 or stored in Memory 26 to be processed later. The program itself may be stored in Memory 26. The program calculates Desired Spark Rate 15 based on Environmental and/or Operational Conditions 11.

Another method for selecting Desired Spark Rate 15 is to use a look up table stored in Memory 11. The look up table may simply include Environmental and/or Operational Conditions 11 and their corresponding given spark rates. The given spark rate corresponding to the present Environmental and/or Operational Conditions 11 is the Desired Spark Rate 15.

Desired Spark Rate 15 is then used to command a spark to an Igniter 20 (step 36). A fuel flow is also provided (step 38), and an ignition in Combustion Chamber 18 of an engine takes place (step 40).

It is noted that the fuel flow is also typically determined by the Engine Controller 14 after evaluating environmental and operating conditions. Engine start flows typically vary with inlet air temperatures and pressure, and engine fluid temperatures.

The above description is meant to be exemplary only, and one skilled in the art will recognize that further changes may be made to the embodiments described without departing from the scope of the invention disclosed. Still other modifications will be apparent to those skilled in the art, in light of a review of this disclosure, and such modifications are intended to fall within the appended claims.

We claim:

1. A method of igniting a gas turbine engine, the method comprising:
   providing a fuel flow;
   providing an engine controller and an exciter, said exciter being separate from said engine controller;
   gathering information on at least one of an environmental condition and an operating condition;
   said engine controller selecting a desired spark rate based on said gathered information; and
   said exciter producing a spark impulse to command an ignition, said spark impulse being produced in response to the selected spark rate, said ignition for igniting said fuel flow.

2. The method of claim 1, wherein said selecting comprises using a program for calculating said desired spark rate.

3. The method of claim 2, further comprising storing said program.

4. The method of claim 1, wherein said selecting comprises using a look up table to obtain said desired spark rate, said look up table comprising said at least one of an environmental condition and an operating condition each corresponding to a given spark rate.

5. The method of claim 4, further comprising storing said look up table.

6. The method of claim 1, further comprising sensing said at least one of an environmental condition and an operating condition.

7. The method of claim 6, wherein said at least one of an environmental condition and an operating condition comprise at least one of inlet air temperature, engine oil temperature, fuel temperature, exciter temperature, exhaust gas temperature, ambient air pressure, fuel pressure and oil pressure.

* * * * *